United States Patent [19]

Hamano et al.

[11] Patent Number: 4,784,020

[45] Date of Patent: Nov. 15, 1988

[54] ANTI CREEP CONTROL METHOD AND SYSTEM PROVIDING DELAY BEFORE ANTI CREEP ACTION STARTING

[75] Inventors: Yukio Hamano; Yutaka Taga, both of Toyota, Japan

[73] Assignee: Toyota Jidosha Kabushiki Kaisha, Toyota, Japan

[21] Appl. No.: 916,112

[22] Filed: Oct. 7, 1986

[30] Foreign Application Priority Data

Oct. 7, 1985 [JP] Japan ................. 60-223355

[51] Int. Cl.⁴ ............................. B60K 41/22
[52] U.S. Cl. ........................ 74/866; 74/867; 192/0.092; 192/3.58
[58] Field of Search ............ 74/866, 867, 877; 192/0.092, 3.58, 0.076

[56] References Cited

U.S. PATENT DOCUMENTS

| | | | |
|---|---|---|---|
| 4,494,640 | 1/1985 | Honig ..................... | 74/877 X |
| 4,513,638 | 4/1985 | Nishikawa et al. ............ | 74/866 |
| 4,513,639 | 4/1985 | Hiramatsu .................. | 74/866 |
| 4,526,065 | 7/1985 | Rosen et al. ............... | 74/867 X |
| 4,644,826 | 2/1987 | Kubo et al. ................ | 74/866 |
| 4,648,289 | 3/1987 | Kubo et al. ................ | 74/866 |
| 4,653,622 | 3/1987 | Miyake .................... | 74/866 X |
| 4,730,708 | 3/1988 | Hamano et al. .............. | 74/866 X |

FOREIGN PATENT DOCUMENTS

| | | |
|---|---|---|
| 47-19962 | 9/1972 | Japan . |
| 56-21047 | 2/1981 | Japan . |
| 57-422433 | 3/1982 | Japan . |
| 58-128552 | 8/1983 | Japan . |
| 58-193953 | 11/1983 | Japan . |
| 59-34050 | 1/1984 | Japan . |
| 59-6454 | 1/1984 | Japan . |

Primary Examiner—Leslie A. Braun
Assistant Examiner—David Novais
Attorney, Agent, or Firm—Oblon, Fisher, Spivak, McClelland & Maier

[57] ABSTRACT

A vehicle automatic transmission includes a torque converter, and also includes a gear transmission mechanism. This gear transmission mechanism includes a manual range setting valve and a plurality of friction engaging mechanisms. Selective engagement of combinations of these friction engaging mechanisms, when the manual range setting valve is set to a forward range, causes the gear transmission mechanism to provide various forward speed stages. In this anti creep control method, a test is performed as to whether anti creep provision conditions hold, the anti creep provision conditions including whether or not the manual range setting valve is set to a forward range, and whether or not the vehicle is substantially stationary. If the anti creep provision conditions hold, after a determinate time interval after the establishment of these conditions, a retest is performed as to whether the anti creep provision conditions hold, and this time if the anti creep provision conditions hold anti creep control is performed from this time point. Thereby hunting of the transmission during anti creep action is prevented. A system is also disclosed for implementing this method.

4 Claims, 4 Drawing Sheets

ANTI CREEP CONTROL METHOD AND SYSTEM PROVIDING DELAY BEFORE ANTI CREEP ACTION STARTING

BACKGROUND OF THE INVENTION

The present invention relates to a method and a system for anti creep operation for an automatic transmission, and more particularly relates to such a method and such a system, in which anti creep action of the transmission is provided by observing whether certain anti creep conditions are holding, and by providing a certain time delay after observing of the occurrence of holding of said anti creep conditions, before actual performing of anti creep action.

The present invention has been described in Japanese Patent Application Ser. No. 60-223355 (1985), filed by an applicant the same as the entity assigned or owed duty of assignment of the present patent application; and the present patent application hereby incorporates into itself by reference the text of said Japanese Patent Application and the claim and the drawings thereof; a copy is appended to the present application. Further, the present inventors wish hereby to attract the attention of the examining authorities to copending patent applications Ser. Nos. 868,513 now U.S. Pat. No. 4,730,708; which may be considered to be material to the examination of the present patent application.

There is a conventional type of automatic transmission for a vehicle which comprises a fluid torque converter which receives at its power input shaft a supply of rotational power from a crank shaft or the like of an internal combustion engine and which transmits said power from its power output shaft with a certain degree of torque amplification and with a certain degree of slippage to a gear transmission mechanism which can selectively provide any one of a plurality of forward speed stages (gearing ratios) between its power input shaft thus connected to said power output shaft of said torque converter and its power output shaft connected to the driven road wheels of the vehicle so as to transmit rotational power thereto. Such a torque converter provides an amount of torque amplification and an amount of slippage between its power input shaft and its power output shaft both of which vary as the rotational speed of the input member (or pump impeller) of said torque converter varies and the load on the power output member (or turbine member) of said torque converter varies, according to determinate performance characteristics of said torque converter. And the gear transmission mechanism, which typically comprises a plurality of selectively engagable gear trains, is set in a determinate way to one or the other of said plurality of forward speed stages, according to the current values of various operational parameters of the internal combustion engine and of the vehicle incorporating it, said operational parameters including but not being limited to engine load (usually taken as being represented by engine throttle opening amount), vehicle road speed, and the one of various shift ranges such as "D" or drive range, "S" or second range, and "L" or low range which is currently selected on a manually controlled range selection means provided to the vehicle. And the manner in which said plurality of forward speed stages is thus selected between according to the current values of said vehicle operational parameters is conventionally described by one or more shift diagrams, typically one for each one of such forward shift ranges which encompasses more than one speed stage.

When the abovementioned manual range setting means is set to "D" or drive range or some other forward driving range and the vehicle speed is substantially zero, i.e. the vehicle is substantially at rest, and further the internal combustion engine is substantially idling: then, in view of the desirability of maintaining a capability for relatively rapid starting off of the vehicle from this stopped condition, it is usually practiced not to put the gear transmission mechanism into a neutral condition in which it is incapable of transmitting rotational power between its power input shaft and its power output shaft, but instead typically said gear transmission mechanism is left as engaged to its first speed stage, i.e. its speed stage in which it provides a maximum reduction gearing ratio between its power input shaft and its power output shaft. Thereby a rapid response is available when the accelerator pedal of the vehicle is pressed in order to move off from rest, and the transmission is maintained in a state ready to transmit rotational power from the engine to the wheels of the vehicle, with the torque converter providing relatively great slippage and transmitting a relatively small amount of torque at this time due to the relatively low rotational speed of its power input member which is being driven by the internal combustion engine which is idling. When the accelerator pedal is in fact thus depressed by the foot of the vehicle driver, the rotational speed of the power output member of the engine (typically its crank shaft) rises, and accordingly the rotational speed of the power input member of the torque converter rises, and thereby the torque converter is caused to transmit substantially more torque, i.e. to provide less slippage between its power input member and its power output member. This increased torque is immediately transmitted by the gear transmission mechanism, since it is being maintained as engaged to its first speed stage as explained above, to the driven road wheels of the vehicle; and thereby the vehicle is caused to move off from rest.

This leaving of the gear transmission mechanism engaged to its first speed stage during the engine idling vehicle stopped condition produces the consequence of being liable to still transmit some substantial amount of torque from the torque converter through said gear transmission mechanism to the driven road wheels of the vehicle at this time. If not counteracted, this produces so called creep of the vehicle, and indirectly leads to engine idling vibration. Further, it becomes necessary for the driver of the vehicle to press relatively hard on the brakes of the vehicle while the vehicle is thus stopped, as for example at a traffic light or the like, in order positively to prevent forward motion of the vehicle. And the drag of the torque converter on the internal combustion engine causes the fuel economy of the engine to be bad, and furthermore the transmission fluid in said torque converter tends to become hot, which can in some cases lead to an overall overheating problem for the vehicle as a whole. Accordingly, various types of anti creep control have been proposed, and implemented, for such automatic transmission systems.

This type of gear transmission mechanism typically includes a clutch which is generally called a forward clutch which is engaged when and only when the gear transmission mechanism is engaged to one of its forward speed stages, i.e. is providing forward driving to the vehicle. This forward clutch typically comprises two sets of friction elements connected to the two members which it selectively engages together, and is typically actuated by said two sets of friction elements being pressed together by a hydraulic servo device which has a pressure chamber for its actuation. Thus, the forward clutch is engaged when hydraulic fluid pressure is supplied to said pressure chamber of said hydraulic servo device thereof, with the engagement pressure between said sets of friction elements of said clutch and accordingly its torque transmission capability increasing the greater is the pressure value of said hydraulic fluid pressure. Accordingly, the assignee of the present patent application, who is also the applicant of the Japanese patent application of which the priority is being claimed for the present application, has proposed - in, for example, Japanese Patent Applications Ser. Nos. 41-18128 (1966), 56-117742 (1981), 57-10444 (1982), 57-75829 (1982), 57-115087 (1982), and 59-176300 (1984), the first of which has been published as Japanese Patent Publication Ser. No. 47-19962 (1972), and the next listed ones of which have been respectively laid open as Japanese Patent Lying Open Publications Ser. Nos. 56-21047 (1981), 58-128552 (1983), 58-193953 (1983), and 59-6454 (1984), and none of which is it intended hereby to admit as prior art to the present patent application except to the extent otherwise required by applicable law - that, in the above described condition when the engine of the vehicle is substantially in the idling condition and the vehicle speed is substantially zero, the hydraulic fluid pressure, which is thus being supplied as an actuating pressure to a frictional engaging device of the gear transmission mechanism which is of the so called forward clutch type which is engaged when and only when the gear transmission mechanism is engaged to one of its forward speed stages, should be substantially decreased. Doing this allows said forward clutch to slip somewhat during this engine idling vehicle stopped operational condition, and desirably this actuating pressure for the forward clutch is in fact so reduced as to be just at the upper level that still ensures that the gear transmission mechanism no longer transmits torque to any substantial extent while the vehicle is stopped. This means that substantially no vehicle creep takes place, and thus there is no requirement for the driver to press on the vehicle brake in order to maintain the vehicle in the stationary state. Further, the occurrence of idling vibration is made much less likely. The fuel economy of the vehicle is also improved. Also, since there is substantially less churning up of the transmission hydraulic fluid in the fluid torque converter, the problem of heating up of said torque converter is substantially overcome. The actuating pressure for the forward clutch can be quickly raised to an appropriate operational level when the accelerator pedal of the vehicle is depressed in order to start off the vehicle from rest, and so the provision of this anti creep device does not make the obtaining of a good response for starting off the vehicle much more difficult. Alternatively, as suggested in the specifications and drawings of Japanese Patent Application Ser. No. 59-176300 (1984), and in Japanese Patent Laying Open Publication Ser. No. 57-42243 (1982), it is possible to set the gear transmission mechanism of the transmission to a higher speed stage during the provision of anti creep action for the transmission.

A problem that has occurred with such a system is as follows. In the above outlined constructions and methods, during the prevalence of the conditions for providing anti creep action, which are typically when the engine of the vehicle is substantially in the idling condition and the vehicle speed is substantially zero, either (in the first type of case discussed above) the actuating hydraulic fluid pressure for the forward clutch is ideally reduced to a so-called waiting valve, which should be as high as possible short of causing said forward clutch to provide substantial torque transmission, so that said forward clutch is ready to be rapidly returned to the engaged state by moderate increase of said actuating pressure, or (in the second type of case discussed above) the gear transmission mechanism of the transmission is set to its aforesaid speed stage higher than its first speed stage. In either case, thus, anti creep action is provided for the transmission, when and only when the conditions therefor, i.e. the condition that the engine of the vehicle is substantially in the idling condition and the condition that the vehicle speed is substantially zero, are prevailing.

However, this rather over simplistic method of operation is not entirely satisfactory. Since anti creep control is performed as soon as the conditions therefor start to be prevailing, thus, in the operational circumstances when said anti creep conditions only hold momentarily, the so called hunting phenomenon occurs. In the first type of case discussed above, this causes the forward clutch to be rapidly engaged and disengaged, so that repeated clutch engagement shock is caused and the service life of the transmission is inevitably shortened. In the second type of case discussed above, the gear transmission mechanism of the transmission is repeatedly set to its aforesaid speed stage higher than its first speed stage, and then back to its first speed stage, thus causing repeated speed stage engagement shock and again inevitably shortening the service life of the transmission.

Because of all this, there has been proposed, in Japanese Patent Laying Open Publication Ser. No. 59-34050 (1984), which it is not intended hereby to admit as prior art to the present patent application except to the extent in any case required by applicable law, the concept of providing anti creep control of a vehicle transmission, in which the occurrence of said conditions for providing anti creep action, i.e. that the engine of the vehicle is substantially in the idling condition and the vehicle speed is substantially zero, is detected, and in which the anti creep control is only performed, if said conditions have persisted throughout a certain time period.

With this method for anti creep control, the above outlined hunting problem is indeed solved, but, if first the conditions for providing anti creep control start to prevail, and then before the elapsing of the above identified determinate time period said anti creep provision conditions stop prevailing, then the time elapsed so far is canceled, and upon the prevailing again of the anti creep conditions the timing is again recommenced. Accordingly, in some conditions of staccato prevailing and not prevailing of the anti creep conditions, the start of the actual provision of anti creep action can become unduly delayed.

SUMMARY OF THE INVENTION

Accordingly, it is the primary object of the present invention to provide a method for anti creep control for a transmission, which avoids the problems detailed above.

It is a further object of the present invention to provide such a method for anti creep control for a transmission, which does not cause any great delay before the provision of anti creep action even when the conditions for providing anti creep vary erratically.

It is a further object of the present invention to provide such a method for anti creep control for a transmission, which prevents the occurrence of hunting.

It is a yet further object of the present invention to provide such a method for anti creep control for a transmission, which can function accurately and effectively to provide proper anti creep action even when operational conditions fluctuate rather.

It is a yet further object of the present invention to provide such a method for anti creep control for a transmission, which does not cause a friction engaging device of the transmission to be unduly repeatedly engaged and disengaged.

It is a yet further object of the present invention to provide such a method for anti creep control for a transmission, which does not cause undue friction engagement mechanism engagement shock.

It is a yet further object of the present invention to provide such a method for anti creep control for a transmission, which does not cause the transmission to be unduly repeatedly shifted between its speed stages.

It is a yet further object of the present invention to provide such a method for anti creep control for a transmission, which does not cause undue speed stage engagement shock.

It is a yet further object of the present invention to provide such a method for anti creep control for a transmission, which maximizes the service life of the transmission.

It is a yet further object of the present invention to provide such a method for detecting the rotational speed of the output shaft of a fluid torque converter for an automatic transmission, which allows anti creep action to be provided which keeps engine fuel economy high and which helps to prevent engine overheating, engine idling vibration, and engine snatch.

It is a concomitant further object of the present invention to provide a system which implements such methods, so as to achieve at least some of the objects detailed above.

According to the most general method aspect of the present invention, these and other objects are attained by, for an automatic transmission comprised in a vehicle, comprising a fluid torque converter and a gear transmission mechanism comprising a manual range setting valve and a plurality of friction engaging mechanisms selective engagement of combinations of which when said manual range setting valve is set to a forward range causes said gear transmission mechanism to provide various forward speed stages: a method for anti creep control, wherein: a test is performed as to whether anti creep provision conditions hold, said anti creep provision conditions including whether or not said manual range setting valve is set to a forward range, and whether or not the vehicle is substantially stationary; and: if said anti creep provision conditions hold, after a determinate time interval after the establishment of these conditions, a retest is performed as to whether said anti creep provision conditions hold, and this time if said anti creep provision conditions hold anti creep control is performed from this time point; and, according to the most general system aspect of the present invention, these and other objects are attained by, for an automatic transmission comprised in a vehicle, comprising a fluid torque converter and a gear transmission mechanism comprising a manual range setting valve and a plurality of friction engaging mechanisms selective engagement of combinations of which when said manual range setting valve is set to a forward range causes said gear transmission mechanism to provide various forward speed stages: a system for anti creep control, comprising: a means for performing a test as to whether anti creep provision conditions hold, said anti creep provision conditions including whether or not said manual range setting valve is set to a forward range, and whether or not the vehicle is substantially stationary; a means for, if said anti creep provision conditions hold, after a determinate time interval after the establishment of these conditions, performing a retest as to whether said anti creep provision conditions hold; and: a means for, if this time said anti creep provision conditions hold, performing anti creep control from this time point.

According to the concept of the present invention as specified above, the anti creep action is conveniently provided when the anti creep provision conditions hold at two time points which are separated by said determinate time interval, even if said anti creep provision conditions fail to hold at some time point in between said two time points Thus, not only is the hunting phenomenon avoided, but also delay in the provision of anti creep action is avoided as compared with the case outlined hereinabove, thus ensuring that prompt anti creep action is made available, thereby to keep engine fuel economy high and to prevent engine overheating, engine idling vibration, and engine snatch.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures; and:

DESCRIPTION OF THE PREFERRED EMBODIMENTS

The present invention will now be described with reference to the preferred embodiments thereof, and with reference to the figures.

OVERALL TRANSMISSION STRUCTURE

Figure 1:
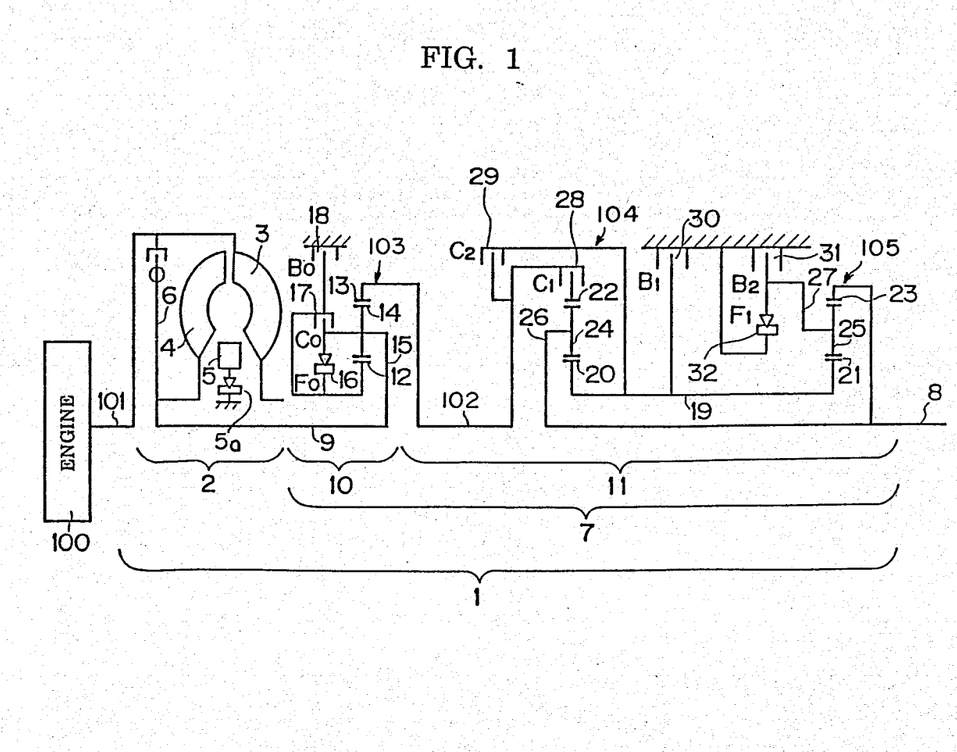
FIG. 1 is a schematic skeleton diagram showing the overall layout of the components of an automatic transmission to which the preferred embodiments of the anti creep control method and system of the present invention are applied.

FIG. 1 is a schematic skeleton diagram showing the overall layout of the components of an automatic transmission, denoted by the reference numeral 1, to which the first preferred embodiments of the anti creep control method and system of the present invention are exemplarily applied. In this figure, the automatic transmission 1 is shown as being powered by an internal combustion engine 100 via a shaft 101 which may be a continuation of the crank shaft of said engine 100, and as transmitting output rotational power to a shaft 8 which leads, although this is not particularly indicated in the figures, to a differential device for powering the driven wheels of the automotive vehicle to which this automatic transmission 1 and this internal combustion engine 100 are fitted.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween.

The fluid torque converter assembly 2 is of a per se conventional three element single stage two phase type with a direct clutch, a comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known fashion, by circulation of transmission fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof with a certain amount of slippage and also of torque amplification being provided therebetween, the amount of such slippage and torque amplification being determined by the rotational speed of the power input shaft 101 of the torque converter assembly 2 and also by the output load on its power output shaft 9. A lock up clutch 6 of a per se known sort is provided for, when optionally engaged by the supply of actuating hydraulic pressure thereto from a control system therefor, directly connecting the power input shaft 101 to the power output shaft 9, thus bypassing the above described hydraulic connection for the torque converter assembly and eliminating said slippage and torque amplification between said input and output shafts provided thereby.

In further detail, the gear transmission mechanism 7 comprises an auxiliary gear transmission mechanism 10 and a main gear transmission mechanism 11. The auxiliary gear transmission mechanism 10 is supplied with rotational power via the aforementioned power output shaft 9 of the fluid torque converter assembly 2, which thus functions as a power input shaft for said auxiliary gear transmission mechanism 10; and a shaft 102 functions as a power output shaft for said auxiliary gear transmission mechanism 10 and also as a power input shaft for the main gear transmission mechanism 11 and transmits rotational power therebetween.

First, the auxiliary gear transmission mechanism 10 will be explained. This mechanism 10 comprises a first planetary gear mechanism 103 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power input shaft 9 of the auxiliary gear transmission mechanism 10 to receive rotational power therefrom, and the ring gear 13 is rotationally connected to the power output shaft 102 thereof so as to transmit rotational power thereto. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotational therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 10 with regard to mutual rotation therebetween in both rotational directions. The clutch C0 and the brake B0 are both per se conventional types of friction engaging mechanisms comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 10 can be controlled to provide either of two gearing ratios or rotational speed stages between its power input shaft 9 and its power output shaft 102, in a manner which will be clear to one of ordinary skill in the relevant art based upon the above explanations.

Next, the main gear transmission mechanism 11 will be explained. This mechanism 11 comprises second and third planetary gear mechanisms 104 and 105 which are arranged on the outside of a hollow intermediate shaft 19 which is coaxially fitted over the aforementioned power output shaft 8 of this main gear transmission mechanism 11. The second planetary gear mechanism 104 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and which perform planetary motion between said sun gear 20 and said ring gear 22 in a per se conventional manner. The sun gear 20 is fixed upon the left end in the figure of the intermediate shaft 19, and the carrier 26 for the planetary pinions 24 is rotationally connected to the power output shaft 8 of this main gear transmission mechanism 11. A clutch C1 28 is provided for selectively, when operated as will be particularly described later by selective and appropriate supply of actuating hydraulic fluid pressure thereto, rotationally connecting said ring gear 22 to the power input shaft 102 of this main gear transmission mechanism 11 with respect to mutual rotation therebetween in both rotational directions. And a clutch C2 29 is provided for selectively, when operated by selective supply of actuating hydraulic fluid pressure thereto, rotationally connecting said power input shaft 102 of this main gear transmission mechanism 11 to the sun gear 20 and to the aforementioned intermediate shaft 19 with respect to mutual rotation therebetween in both rotational directions. The clutch C1 28, which as will be seen later functions as a forward clutch and is engaged when and only when the automatic transmission mechanism 1 as a whole is providing forward drive, is not particularly detailed with regard to its structure in FIG. 1, but can be of a per se conventional type as will be described later in detail; in any case, this clutch C1 is engaged when hydraulic fluid pressure is supplied to its actuating pressure chamber (not particularly shown in FIG. 1), while it is disengaged when no hydraulic fluid pressure is supplied to its said pressure chamber. Further, the clutch C2 29, which functions as a direct clutch, is a per se conventional type of friction engaging mechanism comprising a per se conventional hydraulic actuator system, and like the clutches C0 and C1 is engaged when hydraulic fluid pressure is supplied to its actuating pressure chamber (not particularly shown), while it is disengaged when no hydraulic fluid pressure is supplied to its said pressure chamber. The third planetary gear mechanism 105 comprises a sun gear 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 8 of this main gear transmission mechanism 11. A brake B1 30 is provided for selectively, when operated by selective supply of actuating hydraulic fluid pressure thereto, rotationally connecting the aforementioned intermediate shaft 19 to the casing of this main gear transmission mechanism 11 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 11 with respect to mutual rotation therebetween in both rotational directions. Also, a one way clutch F1 is provided for always rotationally connecting said carrier 27 for said planetary pinions 25 to said casing of this main gear transmission mechanism 11 with respect to mutual rotation therebetween in one rotational direction only. The brakes B1 30 and B2 31 again are per se conventional types of friction engaging mechanisms comprising per se conventional hydraulic actuator systems, and like the brake B0 are engaged when hydraulic fluid pressure is supplied to their pressure chambers (not particularly shown), while they are disengaged when no hydraulic fluid pressure is supplied to their said pressure chambers.

Thus, by selective engagement and disengagement of the clutches C1 and C2 and of the brakes B1 and B2, the main gear transmission mechanism 11 can be controlled to provide any one of three forward gearing ratios or rotational speed stages and one reverse gearing ratio or rotational speed stage between its power input shaft 102 and its power output shaft 8, in a manner which will be clear to one of ordinary skill in the relevant art based upon the above explanations. And, further, the gear transmission mechanism 7 as a whole, as a combination of the auxiliary gear transmission mechanism 10 and the main gear transmission mechanism 11 and by the combined operation thereof, according to selective engagement and disengagement of the clutches C0, C1, and C2 and of the brakes B0, B1 and B2, can be controlled to provide any one of five forward gearing ratios or rotational speed stages including an overdrive speed stage and one reverse gearing ratio or rotational speed stage between its power input shaft 9 and its power output shaft 8, as particularly detailed in the Table which for convenience of pagination is given at the end of the specification and before the claims of the present patent application. In this Table, an "O" in a column relating to a hydraulic clutch or a hydraulic brake indicates that said hydraulic clutch or hydraulic brake is engaged, while an "X" relating to such a hydraulic clutch or hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels (not particularly shown) of the vehicle via the automatic transmission system 1 and on the other hand is free wheeling or disengaged when said engine 100 is not so driving said driven wheels of the vehicle, in other words indicates that said clutch is free wheeling in, and only in, the engine overrun condition; while an "F" relating to a one way clutch indicates that said one way clutch is free wheeling or disengaged. From this Table, it will be understood that: when the automatic transmission 1 is being operated in the drive or "D" range, all five of its forward speed stages including its overdrive speed stage are available to be utilized, according to vehicle operational conditions as will be explained later; but, however, when the automatic transmission 1 is being operated in the second or "S" range, no upshift from the third speed stage to the fourth or the fifth speed stage is ever performed, and only the first through the third speed stages are available to be utilized; and further, when the automatic transmission 1 is being operated in the low or "L" range, no upshift from the second speed stage to the third, the fourth, or the fifth speed stage is ever performed, and only the first and the second speed stages are available to be utilized. And further it will be particularly noted from this Table that the hydraulic clutch C1 is engaged when, and only when, the gear transmission mechanism 7 is engaged to a forward speed stage (i.e., to the first, second, third, fourth, or fifth speed stage), and is otherwise disengaged.

In general, each of the various hydraulic clutches and brakes detailed above, i.e. the clutches C0, C1, and C2 and the brakes B0, B1, and B2, is selectively engaged and disengaged by its hydraulic actuator system, by selective supply of hydraulic fluid pressure thereto from a control system which is an embodiment of the present invention, according to the current values of various operational parameters of the vehicle to which this automatic transmission 1 is fitted, such as vehicle road speed, engine load, range set by the vehicle driver on a manual range setting valve, and so on. Further, when said manual range setting valve is set by the driver to a forward driving range such as "D" range, "S" range, or "L" range, and then the driver releases the accelerator pedal of the vehicle so as to reduce throttle opening to substantially zero, then as the vehicle road speed drops the aforesaid control system shifts the gear transmission mechanism 7 down through its speed stages, and below a certain road speed said gear transmission mechanism 7 is set to its first speed stage, in any one of the aforementioned forward driving ranges. The anti creep control method and system according to the present invention are partially characterized by operating so that, when the manual shift range of the transmission is set to a forward driving range, the vehicle is substantially stationary, and the engine thereof is substantially in the idling condition, the engagement pressure for the forward clutch C1 28 is reduced, so that said forward clutch C1 28 slips somewhat; thereby, anti creep action for the vehicle is provided.

THE PREFERRED EMBODIMENTS

Figure 2:
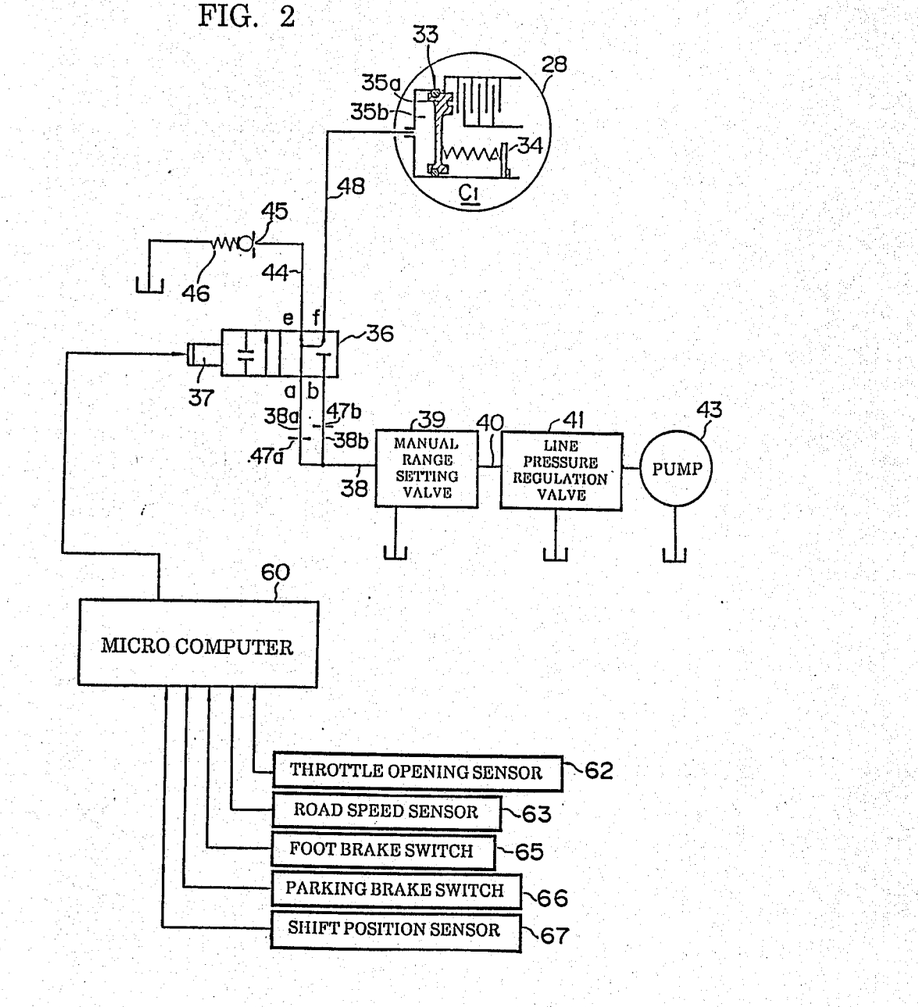
FIG. 2 is a schematic block diagram showing relevant parts of a gear transmission mechanism and a control system therefor, utilized in said automatic transmission of FIG. 1.

Preferred embodiments of the method and system of the present invention for anti creep control will now be described; this system of the hybrid hydraulic/electronic type incorporating a microprocessor. In FIG. 2, a schematic block diagram of relevant parts of said anti creep control system is shown, and also there is shown a partial axial sectional view taken through a relevant version of the previously mentioned forward clutch C1 28 of the gear transmission 7 of the transmission 1 to which this anti creep control system is provided.

In detail, the forward clutch C1 of the main gear transmission mechanism 11 of the gear transmission mechanism 7 to which this first anti creep control system is provided is per se conventional, having two sets of annular clutch plates which are alternately superposed in a sandwiched arrangement, i.e. are mutually interleaved, and the outer peripheries of the one set of these clutch plates are rotationally secured to one of the shaft 102 and the ring gear 22 which this forward clutch C1 28 selectively rotationally couples together (see FIG. 1), while the inner peripheries of the other set of these clutch plates are secured to the other one of said shaft 102 and said ring gear 22. The hydraulic actuator system 33 for this forward clutch C1 28 compriese an annular piston member 35a which can slide to and fro in the left and right directions as seen in FIG. 2 in an annular cylindrical bore which has an inner cylindrical bore and an outer cylindrical bore and which is defined in a member rotationally coupled to (and typically integrally formed with) one of the shaft 102 and the ring gear 22. It should be understood that only a partial sectional view showing one side of the clutch plates, the piston member 35a, the bores, and so on, is shown in FIG. 2, and in fact the forward clutch C1 28 and its actuator system are generally annular and circularly symmetrical.

The annular piston member 35a, in more detail, is generally formed as a flat annulus and extends between the inner cylindrical bore and the outer cylindrical bore and has an annular surface defined on its left side in the figure, and the right hand (in the figure) annular end of a raised annulus formed on its right side surface presses against the superposed sandwich of the sets of clutch plates. Annular seal members are fitted between the outer periphery of the annular piston member 35a and the outer cylindrical bore, and between the inner periphery of said annular piston member 35a and the inner cylindrical bore, and thereby a pressure chamber 35b is defined on the left side in the figure of the piston member 35a, with the effective pressure receiving area within this pressure chamber 35b of the piston member 35a being the aforementioned area of the annular surface of said piston member 35a. Further, an annular spring 34 is provided for biasing the annular piston member 35a in the leftwards direction in the figure, i.e. in the direction to release its pressing upon the superposed sandwich of the clutch plates and to reduce the volume of the pressure chamber 35b. Further, a conduit means to be described shortly is provided for selectively supplying hydraulic fluid pressure to this pressure chamber 35b, or alternatively for draining said chamber 35b.

Accordingly, when no hydraulic fluid pressure is supplied to the pressure chamber 35b of this hydraulic actuator system 33, and this chamber 35b is instead drained, then by the biasing action of the annular spring 34 the piston member 35a is moved to the left in the figure, and thereby the superposed sandwich of the clutch plates is not substantially compressed together at all, and the two sets of clutch plates are not rotationally mutually substantially coupled together, and accordingly no substantial rotational torque can be transmitted from the shaft 102 to the ring gear 22 of the main gear transmission mechanism 11. Further, when hydraulic fluid pressure of a relatively low pressure level is supplied to the pressure chamber 35b of the hydraulic actuator system 33, then the action of this hydraulic fluid pressure urges the piston member 35a in the rightward direction in the figure with a relatively moderate force, against only the opposition of the annular biasing action of the spring 34 which is not very considerable in this context, and thereby the superposed sandwich of the clutch plates is fairly moderately compressed together, and the two sets of clutch plates are rotationally fairly moderately mutually coupled together, and accordingly rotational torque can be transmitted from the shaft 102 to the ring gear 22 of the main gear transmission mechanism 11 with a fairly moderate coupling action; in other words, only a relatively moderate torque can be satisfactorily transmitted. On the other hand, when hydraulic fluid pressure of a relatively high pressure level is supplied to said pressure chamber 35b of said hydraulic actuator system 33, then the action of this pressure urges the piston member 35a in the rightward direction in the figure with a relatively strong force, and thereby the superposed sandwich of the clutch plates is relatively strongly compressed together, and the two sets of clutch plates are rotationally relatively strongly mutually coupled together, and accordingly rotational torque can be transmitted from the shaft 102 to the ring gear 22 of the main gear transmission mechanism 11 with a relatively strong coupling action; in other words, a relatively large torque can be satisfactorily transmitted.

Now, the arrangements for supplying controlling hydraulic fluid pressure to the pressure chamber 35b of the hydraulic actuator system 33 for this clutch C1 28 will be detailed. A hydraulic fluid pump 43 picks up hydraulic fluid from a sump (not shown in detail) and supplies it under pressure via a conduit 42 to a line pressure regulation valve 41, which selectively bleeds off some of said pressurized hydraulic fluid back to the sump so as to produce a line pressure at its output side which is regulated to a substantially constant value; so far, these elements described are per se conventional. This line pressure is supplied via a conduit 40 to the input port of a manual range setting valve 39, which also is per se conventional: this manual range setting valve 39 typically comprises a valve element (not particularly shown) which is manually settable by the driver of the vehicle, via a linkage or the like, to any one of the aforementioned various speed ranges. i.e. "D" or drive range, "S" or second range, "L" or low range, "R" or reverse range, "N" or neutral range, and "P" or parking range. This manual range setting valve 39 has various output ports, which are connected in various combinations to its said input port so as to receive supply of line pressure therefrom when the valve element of said manual range setting valve 39 is positioned to its various positions corresponding to these various ranges; most of these output ports are not relevant to the present discussion, but one of them, which is communicated to said input port of said manual range setting valve 39 when and only when the driver of the vehicle has selected a forward driving range thereon, i.e. has selected "D" or drive range, "S" or second range, or "L" or low range, is communicated via a conduit 38, via a continuation conduit 38a, and via a throttling element 47a located intermediately therein to a port designated as "a" of an anti creep control valve 36. Also, this output port of the manual range setting valve 39 is communicated, via another continuation conduit 38b, and via another throttling element 47b located intermediately therein to another port designated as "b" of said anti creep control valve 36.

The anti creep control valve 36 has four ports, designated as "a", "b", "e", and "f". The ports "a" and "b" are communicated to the manual range setting valve 39 as already described; thereby, when the manual range setting valve 39 is set to any one of "D" or drive range, "S" or second range, or "L" or low range, line pressure is supplied to said ports "a" and "b" with certain flow resistances determined by the throttling elements 47a and 47b interposed to said supplies. The port "e" of the anti creep control valve 36 is communicated to drain via a throttling element 45 and a one way valve 46. And the port "d" of the anti creep control valve 36 is communicated directly, via a hydraulic conduit 48, to the pressure chamber 35b of the hydraulic actuator system 33 for the forward clutch C1 28.

This anti creep control valve 36 is a hydraulic switching valve which comprises a valve element (not particularly shown) which reciprocates in a bore and is urged to the right in the figure by supply of hydraulic fluid pressure to a pressure chamber, not particularly shown, provided at the left end in the figure of said anti creep control valve 36, while said valve element is urged to the left in the figure by the biasing action of a spring, not particularly shown. And the anti creep control valve 36 functions as follows. When the pressure chamber is supplied with a hydraulic fluid pressure less than a determinate pressure value, then as schematically indicated in the figure the aforementioned valve element of said anti creep control valve 36 is positioned by the action of said spring leftwards in its cylinder bore to a first position in which its input port "a" is connected to its port "e" and to its port "f", while its port "b" is isolated and is not connected to any other port. When, on the other hand, said pressure chamber is supplied with a hydraulic fluid pressure greater than said determinate pressure value, then also as schematically indicated in the figure the aforementioned valve element of said anti creep control valve 36 is positioned by the action of said pressure in said chamber which overcomes the action of said spring to a second position rightwards in its cylinder bore in which its input port "a" and its output port "e" are isolated and are not connected to any other ports, while its port "b" is directly connected to its port "f".

Thus, assuming that the driver of the vehicle has positioned the manual range setting valve 39 to a forward driving range as explained above, so that supply of the line pressure is being provided from said valve 39 to the conduit 38 and thence to the ports "a" and "b" of the anti creep control valve 36: if the pressure chamber of said anti creep control valve 36 is being supplied with a hydraulic fluid pressure less than said determinate pressure value, then the port "f" of said valve 36 is provided with the same supply of a pressure from its port "a" which is also being supplied to its port "e", while its port "b" is isolated and is connected to no other ports, and accordingly line pressure is supplied to the pressure chamber 35b of the hydraulic actuator system 33 for the forward clutch C1 28, via the conduit 48, but receiving substantial attenuation according to the action of the throttling elements 45 and 47a. The throttling actions of these throttling elements 45 and 47a are so determined that the forward clutch C1 28 is, at this time, maintained in its condition as slipping just short of transmitting substantial torque between the shaft 102 and the ring gear 22 of the main gear transmission mechanism 11; in other words, so as to not quite allow the vehicle to creep substantially forward. When, however, the pressure chamber of said anti creep control valve 36 is being supplied with a hydraulic fluid pressure greater than said determinate pressure value, then the port "f" of said valve 45 is provided with line pressure from its port "b", while its ports "a" and "e" are isolated and are connected to no other ports, and accordingly substantially full line pressure is supplied to the pressure chamber 35b of the hydraulic actuator system 33 for the forward clutch C1 28, via the conduit 48, without substantial attenuation. Thereby said forward clutch 28 is fully engaged and is able to transmit maximum torque between the shaft 102 and the ring gear 22 of the main gear transmission mechanism 11, without substantial slippage.

The pressure chamber of the anti creep control valve 36 is supplied with actuating hydraulic fluid pressure from an electromagnetic solenoid valve 37. This valve 37 is of a per se known type, and comprises a solenoid (not particularly shown) which is supplied with an ON/OFF electrical signal from an electrical control system which will be described hereinafter. The electromagnetic solenoid valve 37 is so constituted that: when said electromagnetic solenoid valve 37 is supplied with an ON electrical signal, it drains the pressure chamber of the valve 57, so that the pressure therein is definitely less than said certain determinate pressure valve; but, when said electromagnetic solenoid valve 37 is supplied with an OFF electrical signal, it does not thus drain the pressure chamber of said valve 57 at all, so that the pressure therein is substantially line pressure, i.e. is greater than said certain determinate pressure value.

Accordingly, again assuming that the driver of the vehicle has positioned the manual range setting valve 39 to a forward driving range such as "D" range, "S" range, or "L" range as explained above, if the electrical signal supplied to the electromagnetic solenoid valve 37 is OFF, then substantially full line pressure is supplied to the pressure chamber 35b of the hydraulic actuator system 33 for the clutch C1 28, via the conduit 48, without substantial attenuation, and thereby said clutch C1 28 is fully engaged and is able to transmit maximum torque between the shaft 102 and the ring gear 22 of the main gear transmission mechanism 11, i.e. from the fluid torque converter assembly 2 through the auxiliary gear transmission mechanism 10 and then through the main gear transmission mechanism 11 to the output shaft 8 of the transmission, without substantial slippage. When, however, the electrical signal supplied to the electromagnetic solenoid valve 37 is ON, then a lower pressure than line pressure is supplied to the pressure chamber 35b of the hydraulic actuator system 33 for the forward clutch C1 28, via the conduit 48, and thereby as explained above the forward clutch C1 28 is, at this time, maintained in its condition as slipping just short of transmitting substantial torque between the shaft 102 and the ring gear 22 of the main gear transmission mechanism 11; in other words, so as to not quite allow the vehicle to creep substantially forward.

In overall control of the automatic transmission there is provided a control system which in all these shown constructions incorporates a microcomputer 60, shown in FIG. 2 simply by a block; this block, and the term "microcomputer 60", in fact are intended to include not only the microprocessor which performs the computing processes which will be described shortly but also the various I/O interfaces such as D/A and A/D converters and so on associated with said microprocessor, as well as perhaps other functionally related means. This microcomputer 60 controls the engagement and disengagement of all of the hydraulic clutches and brakes detailed above, but only its role in engaging and disengaging the forward clutch C1 is relevant and will be discussed herein. The microcomputer 60 receives input signals from sensors, including: a throttle opening sensor 62, which senses the position of the throttle pedal (not particularly shown) of the internal combustion engine 100 of the vehicle, and which produces an output signal representative thereof, which is taken as representative of engine load; a road speed sensor 63, which produces an output signal representative of vehicle road speed (actually of the rotational speed of the power output shaft 8 of the gear transmission mechanism 7); a foot brake switch 65, which produces an output signal representative of whether or not the foot brake of the vehicle is currently depressed so as to be applied; a parking brake switch 66, which similarly produces an output signal representative of whether or not the parking brake of the vehicle is currently applied; and a shift position sensor 67, which is provided as appended to the manual range selection valve 39, and which produces an output signal representative of what speed range is currently set on said manual range selection valve 39. And the microcomputer 60 repeatedly executes a control program for setting the various clutches and brakes detailed above to be engaged or disengaged.

THE OPERATION OF THIS ANTI CREEP CONTROL METHOD AND SYSTEM

Figure 3:
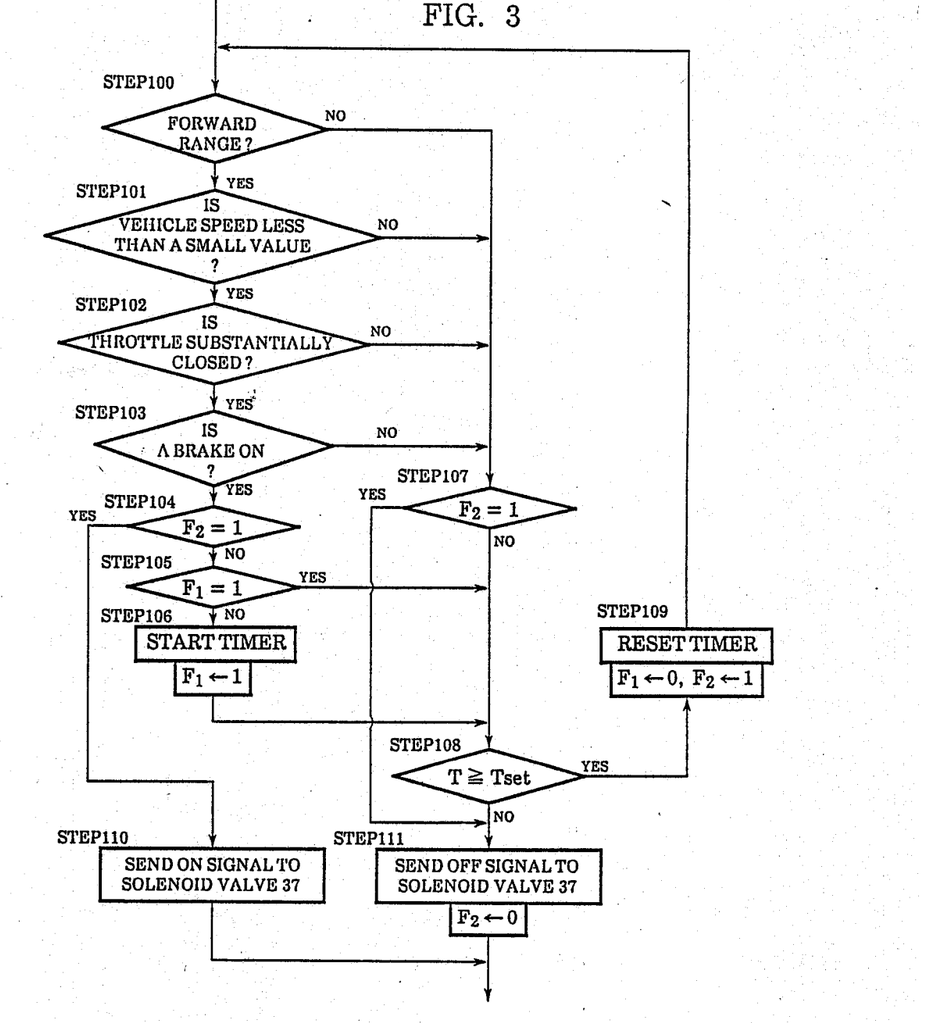
FIG. 3 is a flow chart for a portion of a program executed by a microprocessor incorporated in said preferred embodiment of the anti creep control system of the present invention, which functions so as to perform the first method embodiment.

The portion of said control program relating to the engagement and disengagement by supply of an actuating electrical signal to the electromagnetic solenoid valve 37 for the forward clutch C1 28, utilized in this anti creep control method and system according to the preferred embodiment of the present invention, will now be detailed with reference to FIG. 3 which is a flow chart of said relevant portion. This portion of the program is executed at regular intervals, or once every time the crank shaft of the engine 100 rotates through a determinate angle.

First, in the decision step 100, a test is made as to whether or not a forward driving range, i.e. "D" or drive range, "S" or second range, or "L" or low range, is currently selected on the manual range setting valve 39. The microcomputer 60 makes this decision based upon the output of the shift position sensor 67. If the result of this test is NO, i.e. the range currently selected is not one in which forward vehicle motion is possible, then the flow of control passes next to the decision step 107; but, if the result of this test is YES, so that forward driving is possible, then the flow of control passes next to the decision step 101.

Next, in this decision step 101, a test is made as to whether the vehicle road speed is currently less than a predetermined relatively small value, or not, i.e. as to whether the vehicle is currently substantially stopped, or not. The microcomputer 60 makes this decision based upon the output of the vehicle road speed sensor 63. If the result of this test is NO, i.e. the vehicle is not at this time substantially stationary, then as before the flow of control passes next to the decision step 107; but, if the result of this test is YES, so that the vehicle is currently stopped, then the flow of control passes next to the decision step 102.

Next, in this decision step 102, a test is made as to whether the throttle of the internal combustion engine 100 is currently substantially fully closed, or not, i.e. as to whether the load on said internal combustion engine 100 is currently substantially zero, or not. The microcomputer 60 makes this decision based upon the output of the throttle opening sensor 62. If the result of this test is NO, i.e. the engine throttle is not at this time substantially fully closed so that the vehicle is not currently idling, then as before the flow of control passes next to the step 107; but, if the result of this test is YES, so that the engine load is currently substantially zero and the vehicle is currently idling, then the flow of control passes next to the decision step 103.

Next, in this decision step 103, a test is made as to whether one or both of the braking systems of the vehicle is currently being applied, or not. The microcomputer 60 makes this decision based upon the outputs of the foot brake switch 65 and of the parking brake switch 66. If the result of this test is NO, i.e. no braking system is currently being applied, then as before the flow of control passes next to the step 107; but, if the result of this test is YES, so that one or the other or both of the vehicle braking systems is currently being applied, then the flow of control passes next to the decision step 104.

The conditions defined by the decision steps 100 through 103 are the conditions for the provision of anti creep action. If all of these conditions hold jointly, then anti creep should be provided, and the flow of control thus passes to the step 104; but, if any of these conditions does not hold, then anti creep should not be provided, and the flow of control thus passes to the step 107.

In this decision step 104, a test is made as to whether the current value of a flag F2 is currently unity, or not. The flag F2 indicates whether or not at a predetermined time interval Tset seconds earlier the anti creep conditions held for the first time, or whether or not the anti creep conditions had held previously, the anti creep conditions had held again upon retest thereafter, and anti creep control is in progress. If the result of this test is YES, i.e. the value of the flag F2 is in fact unity, then the flow of control skips to pass next to the step 110; but, if the result of this test is NO, so that the value of the flag F2 is not now unity, then the flow of control passes next to the decision step 105.

In this decision step 105, a test is made as to whether the current value of a flag F1 is currently unity, or not. The flag F1 indicates whether or not the anti creep conditions have held once. If the result of this test is YES, so that the value of the flag F1 is currently equal to unity, then the anti creep conditions have held, then the flow of control passes to pass next to the step 108 to test whether or not a determinate time interval has passed since their holding; but, if the result of this test is NO, so that the value of the flag F1 is currently not equal to unity, then this time is the first time that the anti creep conditions have held, and then the flow of control passes to pass next to the step 106.

In this step 106, a timer is started in order to measure the time since the anti creep conditions have been established, and next the flow of control passes to the decision step 108.

On the other hand, in the step 110, an ON electrical signal is supplied to the electromagnetic solenoid valve 37, so that as explained above the forward clutch C1 28 is put into the condition of being operated with a reduced torque transmission capability and is held approximately at its slippage point, in other words so that anti creep action is performed with the forward clutch C1 28 being held with a certain degree of slippage, just before the point of substantial torque transmission, substantially not torque transmission thus being provided from the fluid torque converter assembly 2 to the front ring gear 22. Thereby, idling vibration is reduced, and the undesirable creeping forward effect of the vehicle while stationary is effectively prevented. Then, the flow of control passes next to leave this anti creep control routine, without doing anything further.

In the other program branch, in the decision step 107, a decision is made as to whether the value of the flag F2 is currently equal to unity, or not. This means that, although the anti creep conditions do not hold at this time, a test is made as to whether they did hold Tset seconds earlier. If the result of this test is YES, i.e. the value of the flag F2 is in fact unity, then the anti creep conditions did hold Tset seconds ago but now upon retest they do not hold, and in this case in order to stop the anti creep control action the flow of program control skips to pass next to the step 111; but, if the result of this test is NO, so that the value of the flag F2 is not now unity and this is not a retest decision, then this is simply regarded as the anti creep conditions not holding, and in this case the flow of program control passes next to the decision step 108.

In this next decision step 108, the process is in the middle of counting from the time that the anti creep conditions are satisfied, and here a test is made as to whether the current value timed on the timer is currently greater than or equal to a determinate value Tset, or not. The value Tset is predetermined in view of the idling characteristics of the engine 100, and is typically set by experiment. When the time timed by the timer is greater than or equal to this determinate value Tset, then the anti creep conditions are holding again, and in this case the flow of control is transferred to pass next to the step 109. Thus, when the anti creep conditions first hold, and the count with the timer T is progressing, the flow of program control passes in order through the steps 103, 104, 105, 106, and 108; while, when the conditions have held and then are continuing holding, the flow of program control passes in order through the steps 103, 104, 105, and 108, omitting the step 106; and, when the conditions have held and then before the elapsing of the time Tset do not hold, the flow of program control passes in order through the steps 100, 103, 107, and 108. On the other hand, if the result of this test is NO, so that the anti creep conditions have not held even once, then in this case T=0 and the flow of control passes next to the step 111.

In the step 109, the timer is reset, and the flags F1 and F2 are set to zero and unity respectively, and then control passes back to the decision step 100 again, to loop around again through this program portion.

On the other hand, in the step 111, an OFF electrical signal is supplied to the electromagnetic solenoid valve 37, so that as explained above the forward clutch C1 28 is now put into the condition of being substantially completely and firmly engaged, if of course the manual range selection valve 39 is currently set to a forward driving range. Thus, a normal first or forward speed stage of the gear transmission mechanism 7 is made available. And then the flag F2 is set to zero, thereby to indicate this condition; and then the flow of control passes next out of this anti creep routine, without doing anything further.

Figure 4:
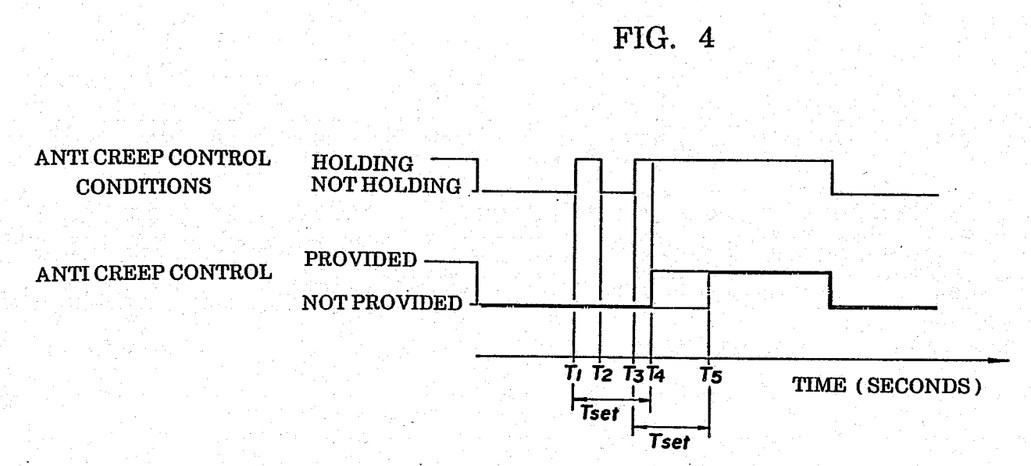
FIG. 4 is a time chart for illustrating the operation of said preferred embodiments of the present invention by comparison with a prior art anti creep control system.

The above described anti creep control method and system according to the preferred embodiments of the present invention are illustrated in the time chart of FIG. 4. In this figure, with reference to a particular exemplary transmission operation episode, the top line illustrates the history of the holding and not holding of the conditions for providing anti creep control, i.e. of the conditions of the steps 100 through 103 of the FIG. 3 flow chart, while the bottom solid line illustrates the history of whether or not said anti creep control was actually provided and the bottom dot dot dashed line shows what would have happened in the case of a prior art type anti creep method and system. In the case of the top line, at the time point T1 the anti creep provision conditions started to hold, but at the time point T2 they stopped holding. Thus, no anti creep control was provided around these times, since the time interval between the time points T1 and T2 was less than the determinate value Tset. At the time point T3 the anti creep conditions started to hold again, and this time they continued holding through the time point T4 which was separated from the time point T1 by the time interval Tset, and accordingly as shown by the bottom solid line the anti creep control was started to be provided at this time point T4, particularly according to the present invention. By contrast, what would have been done in the case of a prior art type of anti creep control is shown by the bottom dot dot dashed line; it is clear from this line that anti creep control would not have been started until a time point T5 which is separated from the time point T3 by the time interval Tset; and the time point T5 is substantially later than the time point T4. Thus, the start of anti creep control is unduly delayed in the prior art.

The concept of the present invention has been shown in the preceding exemplary case as applied to a type of anti creep control in which the engagement of a forward clutch of the gear transmission mechanism of the transmission was softened and weakened, so as to prevent vehicle creeping; but the present invention is not to be considered as being limited only to this method of anti creep control, and in fact the present inventive concept can be applied to a type of anti creep control in which the gear transmission mechanism is upshifted to a speed stage higher than its first speed stage, or t a type of anti creep control in which the capacity of the fluid torque converter to transmit torque is reduced.

Although the present invention has been shown and described in terms of the preferred embodiments of the method and of the system thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow after the Table.

TABLE

|  |  | C1 28 | C2 29 | C0 17 | B1 30 | B2 31 | B0 18 | F1 32 | F0 16 |
|---|---|---|---|---|---|---|---|---|---|
| "P" RANGE |  | X | X | O | X | X | X | F | F |
| "R" RANGE |  | X | O | O | X | O | X | F | O |
| "N" RANGE |  | X | X | O | X | X | X | F | F |
| "D" RANGE | 1ST | O | X | O | X | X | X | O | O |
|  | 2ND | O | X | X | X | X | O | O | F |
|  | 3RD | O | X | O | O | X | X | F | O |
|  | 4TH | O | O | O | X | X | X | F | O |
|  | 5TH | O | O | X | X | X | O | F | F |
| "S" RANGE | 1ST | O | X | O | X | X | X | O | O |
|  | 2ND | O | X | X | X | O | O | O | F |
|  | 3RD | O | X | O | O | X | X | F | O |
| "L" RANGE | 1ST | O | X | O | X | O | X | O | O |
|  | 2ND | O | X | X | X | O | O | O | F |

What is claimed is:

1. For an automatic transmission comprised in a vehicle, comprising a fluid torque converter, a gear transmission mechanism, a manual range setting valve and a plurality of friction engaging mechanisms, selective engagement of said friction engaging mechanisms when said manual range setting valve is set to a forward range, causing said gear transmission mechanism to provide various forward speed stages:

a method for anti creep control, comprising the steps of:

repetitively testing at short time intervals whether anti creep provision conditions exist, said anti creep provision conditions including whether or not said manual range setting valve is set to a forward range, and whether or not the vehicle is substantially stationary; and:

when said anti creep provision conditions are first detected, and said anti creep provision conditions are again detected after a determinate time interval therefrom, anti creep control is performed from this time point.

2. The method of claim 1, wherein said anti creep control is always performed from said time point.

3. For an automatic transmission comprised in a vehicle, comprising a fluid torque converter, a gear transmission mechanism, a manual gear range setting valve and a plurality of friction engaging mechanisms, selective engagement of said friction engaging mechanisms when said manual range setting valve is set to a forward range causing said gear transmission mechanism to provide various forward speed stages:

a system for anti creep control, comprising:

first means for repetitively performing at short time intervals a test as to whether anti creep provision conditions exist, said anti creep provision conditions including whether or not said manual range setting valve is set to a forward range, and whether or not the vehicle is substantially stationary;

second means for counting a determinate time interval after said anti creep provision conditions are first detected by said first means; and:

third means for performing anti creep control from a time point that said first means detects said anti creep provision conditions and said second means has counted said determinate time interval.

4. The system of claim 3, wherein said third means comprises means for always performing anti creep control from said time point.

* * * * *